Figure 1:
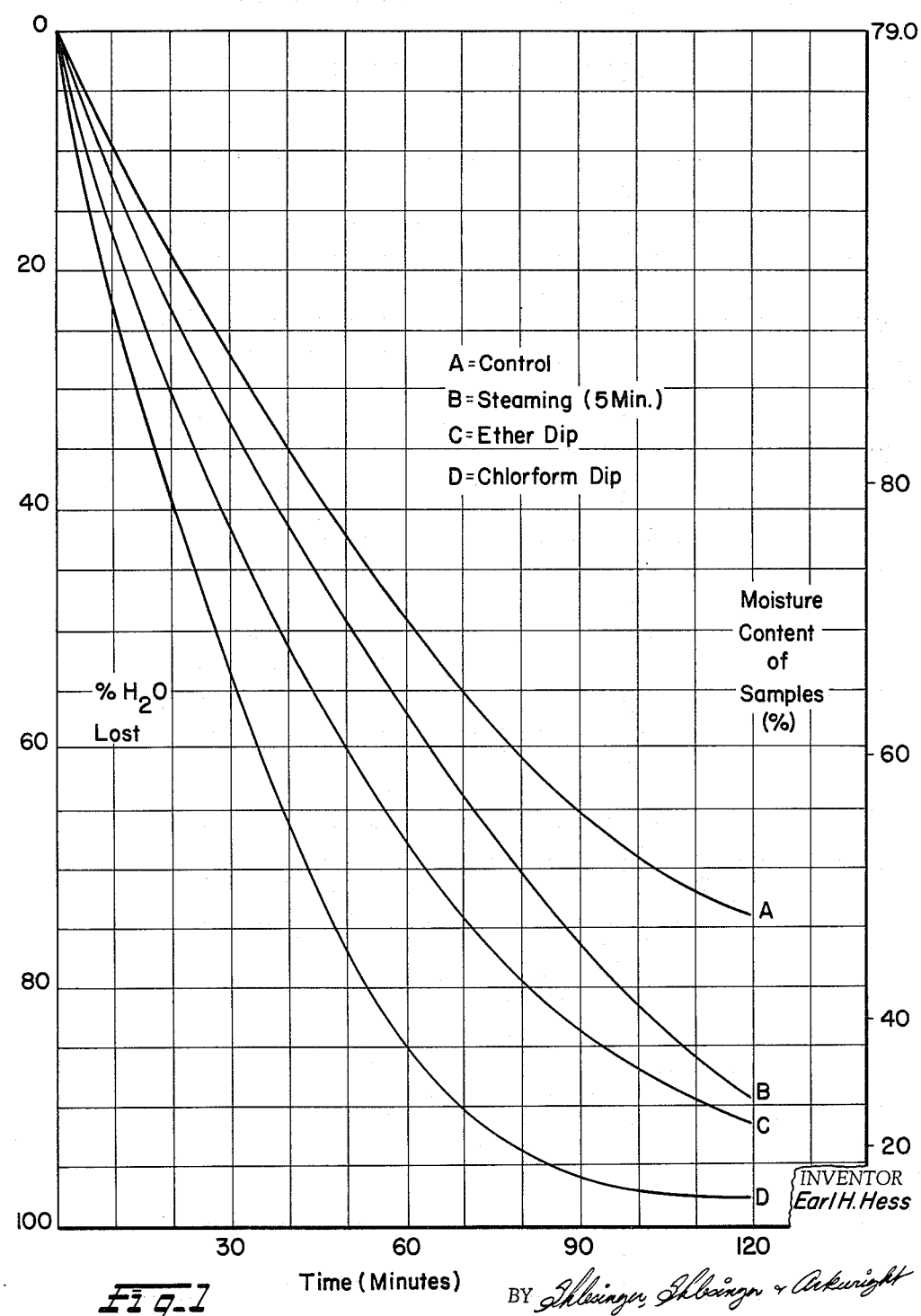

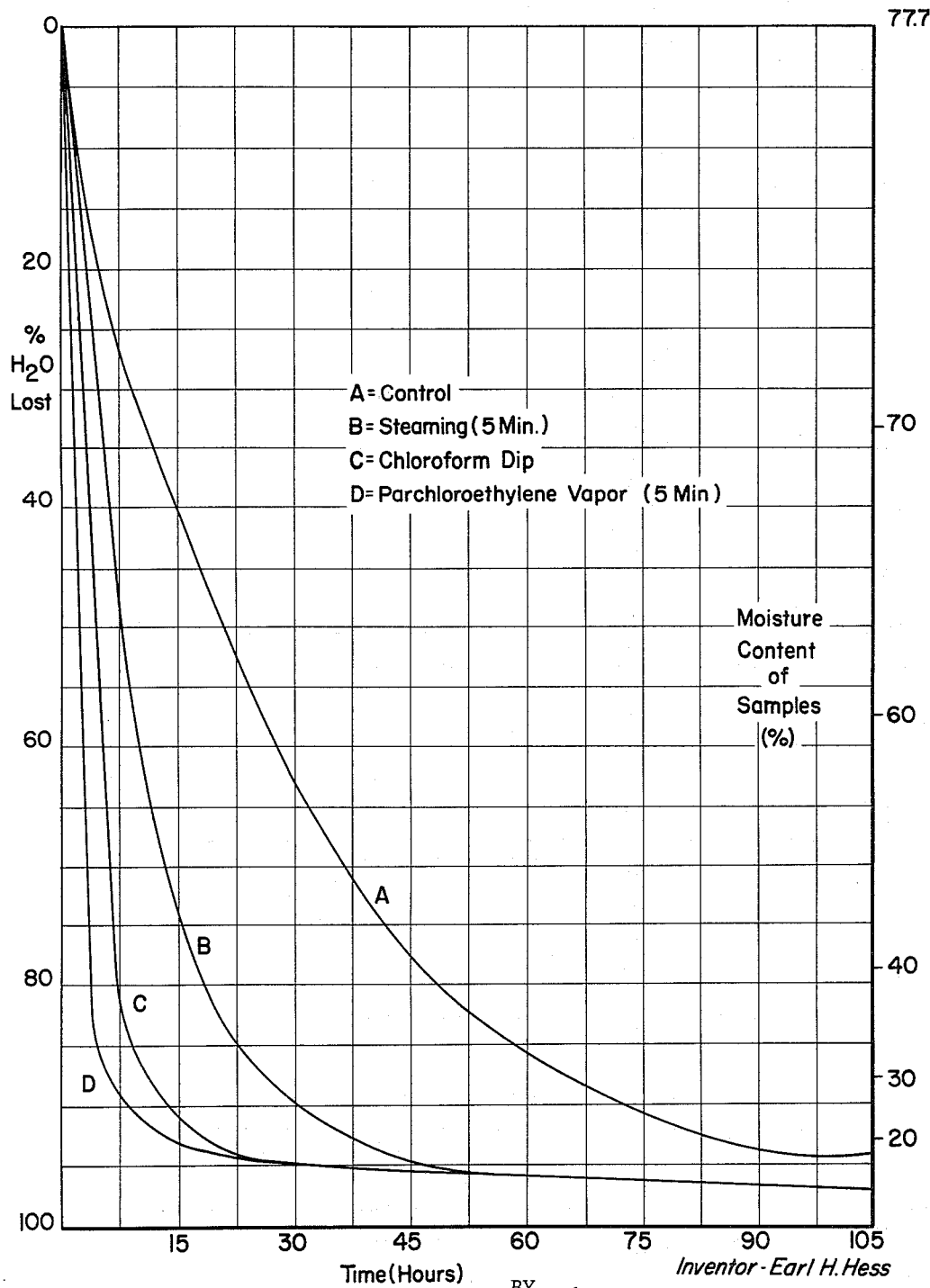

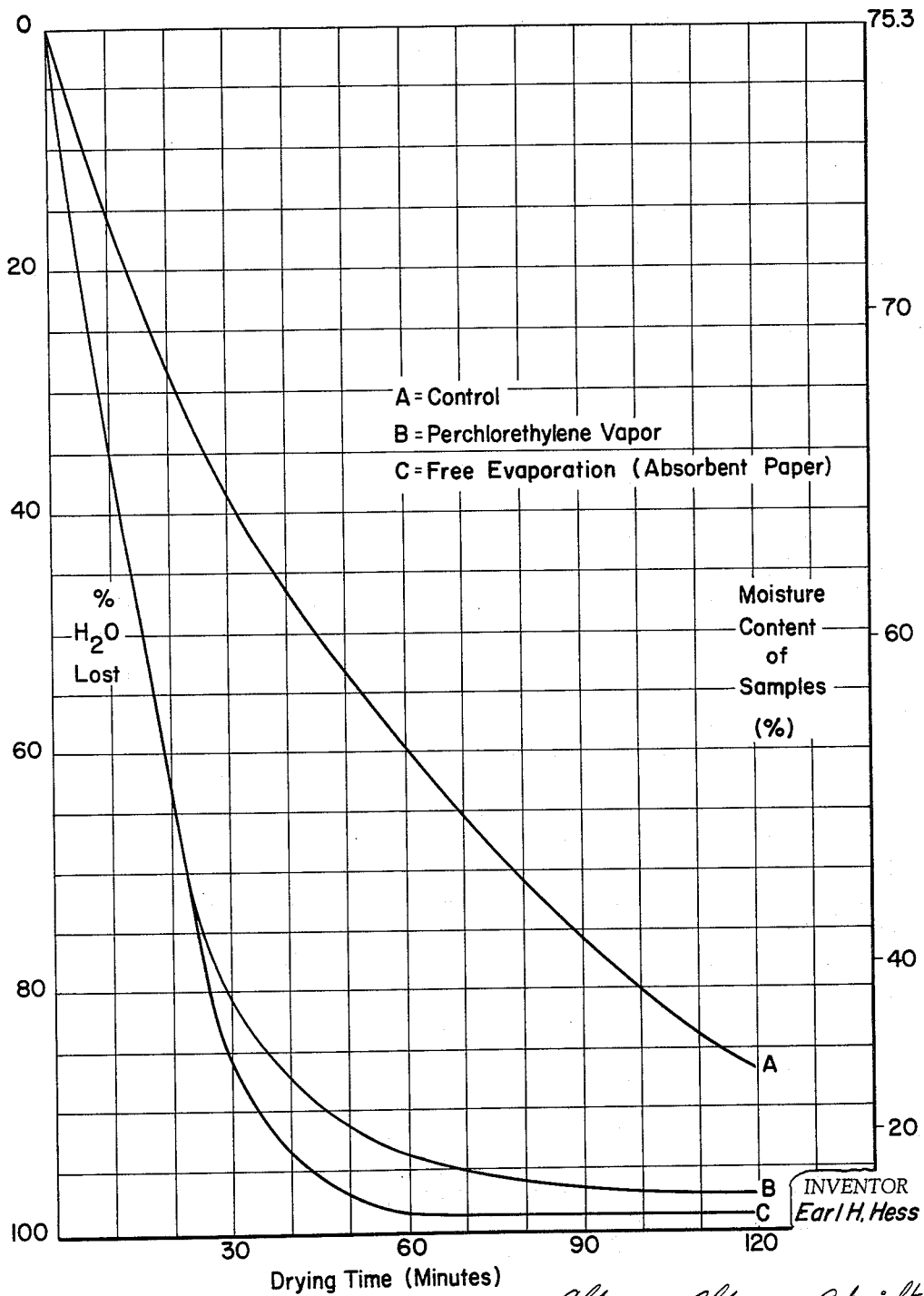

United States Patent Office 3,218,172
Patented Nov. 16, 1965

3,218,172
FORAGE PROCESSING
Earl H. Hess, Lancaster, Pa., assignor to Sperry Rand Corporation, New Holland, Pa., a corporation of Delaware
Filed June 19, 1964, Ser. No. 376,375
15 Claims. (Cl. 99—8)

This invention relates to methods and means for accelerating the drying of forage and more particularly with stored forage crops.

For centuries man has been concerned with the drying of cut forage crops. It is well known that the faster the drying process can be undertaken, the less likelihood of degradation. It is also been known that certain drying techniques have deleterious effects and reduce the nutritional quality of the stored crops. Some progress has been made in recent years in the preservation of the nutritional qualities of the forage crops by improved handling and storing techniques not only in the drying but also in the ensiling of the forage. Nevertheless, with present methods, large nutritional losses still occur, and drying times are still lengthy.

Because economic considerations play an important role in the problem of forage processing, known techniques such as freezing, freeze drying and the like utilized in the preservation of fresh plant material cannot be practically used though to do so would retain nearly all of the original nutritional value.

In general, methods presently used for food preservation are based on one or more of the following principles:

(1) Low temperature storage,
(2) Dehydration,
(3) Exclusion of oxygen (often preceded by sterilization),
(4) The use of preservatives.

Each performs the function of inhibiting or slowing the reactions of enzymatic and microbiological degradation. Insofar as forage is concerned, preservation is usually accomplished by drying or, in the case of ensiling, by exclusion of oxygen. This invention relates most directly to the preservation via the dehydration mechanism. Additionally this invention concerns the alteration, redirection, or prevention of biochemical reactions that occur during drying so as to prevent undesirable changes thereby reducing nutritional losses.

*Biochemical considerations relative to forage drying*

The biochemistry of living plants can best be understood by recognizing at the outset the existence within the plant cells of a host of complex dynamic chemical equilibria. By definition we understand that the balance which exists in a state of dynamic equilibrium does not result from the absence of chemical reactions but rather from the exact balance in rates between two opposing reactions.

It is generally recognized that the moisture balance within plants is regulated by the stomata which open and close by the expansion and contraction of guard cells, depending upon the needs of the plant. When the plant is severed from its root system, the stomata quickly close in an effort to preserve life of the individual cells as long as possible, thus encapsulating the water and making it difficult to remove. The waxy coating on the surface of the plant serves as a barrier against further moisture loss. It will also be obvious that drying can be accelerated by removing or altering the waxy leaf and stem coating which acts as the moisture barrier. No longer possessing their normal synthetic abilities, the plant cells are forced to draw upon their nutrient reserves as the source of energy for essential life processes. Carbohydrates and fats are the first to be utilized, followed, in later stages of starvation, by the catabolism of protein. The obvious net effect of these changes when allowed to occur in forage is the loss of a part of its nutrient value as an animal feed.

Fortunately, under practical conditions of forage harvesting, these undesirable chemical reactions are stopped far short of completion. Since biochemical reactions are highly dependent upon water as a reaction medium, dehydration of the plant material gradually brings these enzyme-promoted catabolic reactions to a halt. Thus we have a basic chemical explanation of the improvement in quality brought about in forage by techniques such as crimping, crushing and forced drying which accelerate the drying process. Another important consideration must be mentioned, however, in regard to forced drying. Increases in temperature to a point speed up enzymatic reactions so that care must be exercised that greater nutrient losses are not effected in a short drying time than in a longer, lower temperature process.

In any event studies have generally been aimed at the treatment of forage so as to lock the stomata in open position to thus accelerate drying. It will also be obvious that drying can be accelerated by removing or altering the waxy leaf and stem coating which acts as a moisture barrier.

*Typical types of control of basic biochemical reactions*

From the above, it is obvious that there is a need for quenching as quickly as possible the catabolic processes which begin after forage is cut.

In the field of frozen foods, blanching is usually done prior to the food freezing step. The blanching quickly destroys enzymes and whatever other biological factors contribute to undesirable degradation reactions. In the home, this is done by a short term immersion in boiling water while commercially it is accomplished by a one to two minute exposure to live steam.

In the curing of different tobaccos, various techniques can be used to regulate the biochemical reactions.

In certain types of tobacco (e.g. Pennsylvania Seedleaf) the catabolic reactions previously discussed are highly desirable. Thus leaves are allowed to remain attached to the stalk and drying is brought about very slowly. Even after the curing stage is completed, moisture is added back to the product so as to allow further biochemical conversions. Finally after loss of essentially all of the metabolizable carbohydrate and much of the protein, the product is suitable for smoking.

With cigar wrapper tobacco a much less severe processing is used. Leaves are detached from the stalks and dried under controlled conditions so that chlorophyl destruction and browning occur, but the reactions are stopped short of loss of the textural strength essential to wrapper quality.

In still a third type (flue cured cigarette tobacco) it is desired to preserve essentially unchanged a tobacco which is high in carbohydrate and low in protein by reason of its having been grown under low nitrogen fertilization. This is accomplished by the flue curing process which involves the use of high temperature treatment to accomplish rapid enzyme destruction and dehydration of the leaf tissue.

Another typical method of control is in the fermentation of cacao beans. The beans are placed on heaps so that the heat produced gradually raises the bulk temperature. The initial effect is to accelerate biochemical reactions (in this case desirable ones). Careful control of this spontaneous heating process permits one to obtain the proper degree of reaction.

Forage processing in general

Heat, as mentioned above, is probably the most common method of inactivating enzymes. It must be done carefully and rapidly with sufficient intensity to kill. Dry heat such as hot air or flaming techniques cannot accomplish this effectively partly because of the inability to penetrate the plant tissue rapidly but perhaps more important because of the evaporative cooling effect. Live steam is one important aspect of this invention since a brief scalding permits more rapid dehydration of the plant tissue.

Another approach to the rapid internal heating of the plant in order to halt chemical degradation, is the application of infrared energy or micro wave energy. Here the energy is converted to heat only after it is absorbed thus permitting the rapid internal application of heat to absorbing substances independent of conventional heat transfer limitations. Evaporative cooling would occur under these conditions only on the exposed surface but not within the plant tissue.

In addition to the heating step, this invention relates to the use of chemical substance which will interfere with the biochemical reactions and inactivate the enzymes. The material must be inexpensive, cause no adverse physiological effects, in animals, or if it does, be readily removable before ingestion by the animals. Since many organic solvents possess protein denaturing properties, and since these properties are particularly pronounced at slightly elevated temperatures, more rapid penetration into the cells is accomplished when chemicals are used with heat. The use of certain solvents inactivates the enzymes by reason of their metal binding (chelating) capacity. Since trace metals such as iron and copper are vital to the activity of most enzymes, inactivation can occur by this mechanism. It is particularly important that the chemical solvent be the type which can be evaporated during the subsequent dehydration step.

This invention also relates to the conditioning of the forage by a surfactant rinse permitting drying in a very short period of time. The rinse removes the waxy coating which normally acts as a barrier to moisture loss.

A further step in the process involves the addition and inoculation between the step of enzyme inactivation and the dehydration step with selected hydrolytic enzymes.

The purpose of adding enzymes [1] is to increase the digestibility of such nutrients which normally fall into the crude fiber fraction possessing low digestibility. These enzymes possess the ability to break down the cellulose, hemicellulose, lignin, etc., which are carbohydrates into less complex sugars of greater digestibility without promoting their oxidative destruction.

Prior to the actual drying stage, it is desirable that a short period of incubation be accomplished in order to enable the aforementioned enzymatic inoculation to proceed as near to completion as possible. In addition to direct addition of enzymes, microorganisms capable of elaborating such enzymes could be used.

From the above, it can now be seen that this invention is directed primarily to the inactivation of destructive enzymes which produce chemical degradation. Though the invention involves primarily the use of solvents and/or detergents and emulsifying agents for the purpose of producing rapid drying, it also is concerned with the promoting of hydrolytic breakdown of the components of "crude fiber" through a reinoculating enzyme followed by an incubation.

---
[1] Readily available commercially.

Because of the economic considerations referred to above which necessitate adapting a method which would be practical in the drying of forage, certain of the techniques described in the processes above, with modification have been adapted to obtain a rapid drying of forage and a halting of the chemical degradation associated therewith in order to increase the nutritional value of the forage and to maintain stability.

It is therefore an object of this invention to provide a process which enables one to speed up the drying process of forage over present systems.

A further object of this invention is to increase the nutritional value of the forage by halting the chemical degradation associated with the forage drying process.

Another object of this invention is to provide a method of drying forage which is inexpensive and which can compete with present operating processes.

Still another object of this invention is to provide a superior forage for live stock and the like which can be stored for long periods of time without large nutritional losses.

Yet a further object of this invention is to provide a means for drying forage which does not require complex apparatus.

A further object of this invention is to provide a process which may be carried out by the farmer with a minimum of instruction.

Another object of this invention is to provide a method of drying forage which may be mobile or stationary and readily adaptable to various geographic conditions.

These and other objects will be apparent from the following description and claims.

In the drawings:

FIGURES 1 through 4 illustrate a series of graphs showing moisture contents of samples plotted against the drying time.

Sampling techniques, drying conditions, and equipment

In order to obtain accurate, reproducible, and practical procedures for experimentation, a forced-draft oven was employed and a temperature was maintained at 60° C. (131° F.) for experimental studies. Wire baskets were used in order to obtain the best advantage from the circulating forced-draft. In order to obtain representative samples, several hundred stalks of forage were cut at approximately grass-cutter level. These stalks were sorted and excessively large or small stalks were discarded. The remainder were weighed to obtain the average weight and the percentages of the stalks lying in various weight ranges around the average were calculated. For stalks weighing 1 gram, 1½ grams and 2 grams of the average, the respective percentages were found to be about 30%, 39% and 45% respectively. From each of the above three weight classes, 40 stalks were randomly divided into four samples of ten stalks each. Each sample was weighed and the coefficients of variation (CV) in the weights were found to be 1.2, 5.2, and 8.4 for the respective weight classes. (A CV of 1.2 means that a single repeat of the experiment should (ninety-five times out of one hundred) give a value equal to 1.2 percent of the average of the values used.) Since about 30% of the stalks weigh within one gram of the average weight, approximately 200 stalks would have to be weighed to obtain a routine sample of 60 stalks (10 stalk duplicates for control and two experimental treatments). Stalks weighing within 1 gram of the average weight when the latter is in the order of 7 grams was used and when the averages was lower, the weight range was reduced correspondingly.

Steam treatments

Duplicate 10 stalk samples were suspended in a wire basket over boiling water and treated from two to five minute intervals and the drying rate studied by weighing every ½ hour for 2 hours. This treatment at 60° C. (140° F.) was followed by a final drying for two hours at 110° C. (230° F.) to determine the final percentage of dry matter. This method eliminates the up take of excess moisture which would be obtained from dipping in boiling water.

*Solvent dipping experiments*

Solvent dipping experiments were undertaken utilizing samples as set out above and FIGURE 1 shows a graph which demonstrates that the drying rate is enhanced to a greater extent by dipping for 30 seconds in ether or chloroform than it is by steaming for 5 minutes. It was found that chopping the stalks of the control into ½ inch sections essentially produce the same drying results as that of steaming. It is to be noted on FIGURES 1 through 4, and the drying time is plotted versus the percentage of the total moisture originally present which is lost up to the given time. Although it may be more conventional to express the amount of moisture lost in terms of the moisture content at that time, it was felt that this method of plotting did not present a true picture of the rate of moisture removal since it involved a nearly logarithmic relationship. However, the moisture contents were calculated for various levels and are inserted in the right hand margin of each graph. Thus, the moisture contents of the samples can be rather easily compared at any time in question.

From the experiments, it was determined that the effectiveness of the solvent was directly related to its polarity. Immersion of the plant or the stalk or cuttings in an organic solvent was determined the simplest way of removing the waxy coating of the plant. It was found that nearly all solvents remove measurable amounts of the waxy coating from the plant. It was determined that the solvents most effective are those which fall at the intermediate point on the solvent polarity scale. Such solvents as chloroform, benzene, etc. are quite effective whereas petroleum, ether (low polarity) and acetone (high polarity) are ineffective. It was concluded that the primary barrier to moisture loss is the lipid layers composing the epidermal surface of the plant itself.

The following table shows the relative effectiveness of various solvents in the order of increasing polarity. Each was given a numerical evaluation ranging from zero to five on the basis that a value of five designates an effectiveness comparable to that of chloroform:

TABLE 1

| Solvent: | Evaluation |
|---|---|
| Petroleum ether | 0 |
| Carbon tetrachloride | 5 |
| Benzene | 5 |
| Perchloroethylene | 4 |
| Ether | 3 |
| Chloroform | 5 |
| Acetone | 0 |
| Isopropanol | 0 |
| Methanol | 0 |

*Solvent vapor treatments*

Figure 2:
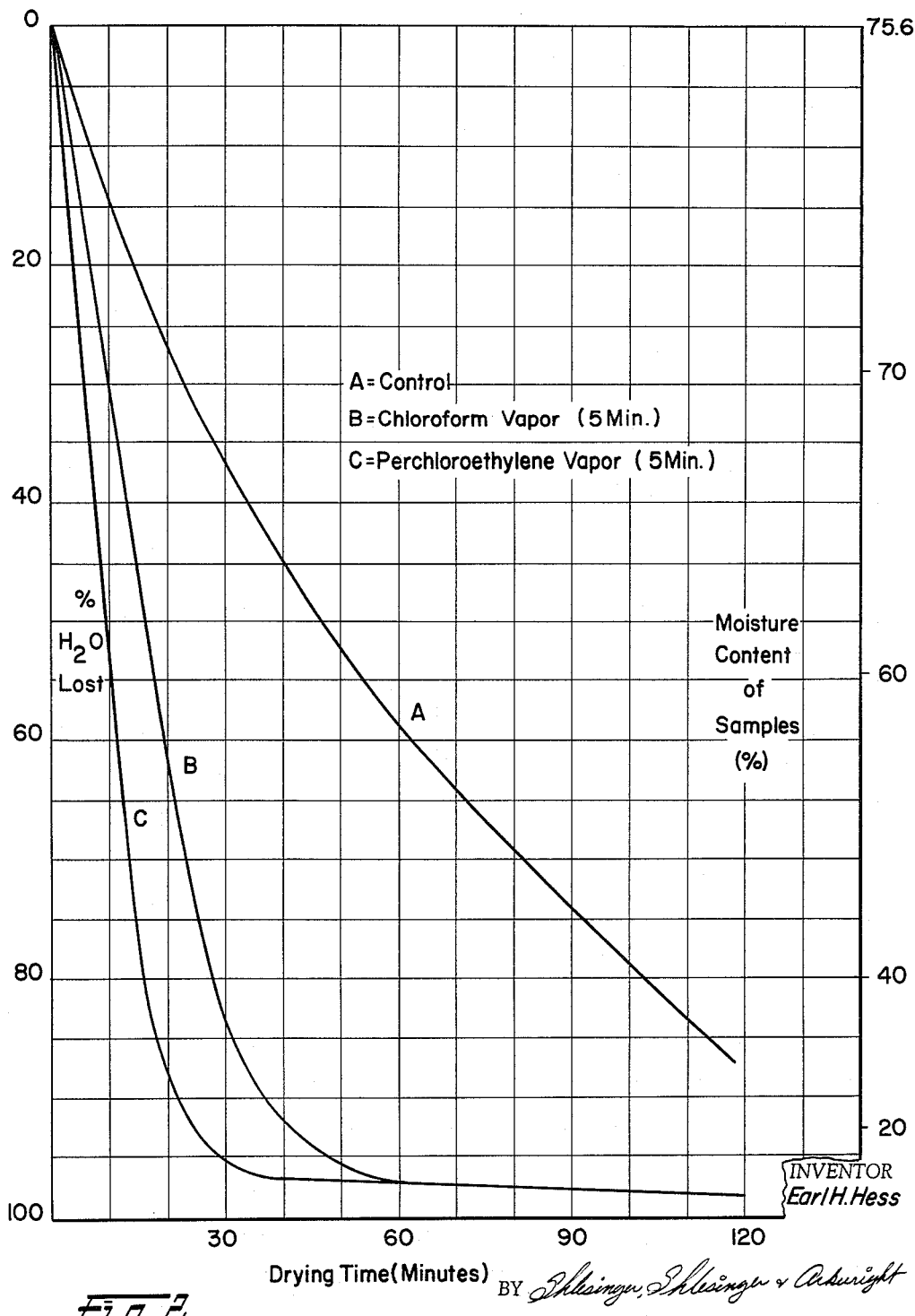

A series of vapor treatments were performed in an effort to combine the denaturing effect of heat with the particular capability of given solvent. The experimental samples were exposed to the boiling vapors by the steaming method for 2 and 5 minutes in each case. The samples subjected to the hot vapors of boiling perchloroethylene (boiling point 121.2° C.) exhibited the most dramatic effect observed. The graph of FIGURE 2 shows that chloroform (boiling point 61.2° C.) was not quite so effective, perhaps due to the lower boiling temperature.

A series of predeterminations were carried out in an effort to discover whether the treatment was detrimental to the protein content even though it increased the drying rate. The table below indicates the results:

TABLE 2

| Sample: | Percent protein (dry weight basis) |
|---|---|
| Control [1] | 24.6 |
| Steam (2 min.) | 25.4 |
| Steam (5 min.) | 27.3 |
| Control | 24.4 |
| Ether dip | 25.0 |
| Chloroform dip | 24.5 |
| Control | 24.4 |
| Benzene dip | 23.4 |
| Carbon tetrachloride dip | 23.2 |
| Control | 23.2 |
| Perchloroethylene dip | 23.9 |
| Control | 22.6 |
| Perchloroethylene vapor (2 min.) | 23.4 |
| Perchloroethylene vapor (5 min.) | 23.4 |
| Control | 23.6 |
| Chloroform vapor (2 min.) | 23.9 |
| Chloroform vapor (5 min.) | 23.5 |

[1] Due to the changing nature of the constantly maturing raw material, it is necessary to run a control along with each drying study. Thus, the variation in the protein contents of the controls is a result of sampling at different growth levels. The protein content of each treated sample should be related to that of the control immediately preceding it in the table.

The results indicate that the protein content is increased by the hot vapor treatments and not seriously effected by the solvent dips.

In view of the above, it was noted that the effectiveness of the solvents in promoting drying rate was improved by bathing the forage in heated solvent vapors. It was also concluded that a solvent of intermediate polarity and high boiling point was particularly effective thus perchloroethylene was found particularly desirable because it has an intermediate polarity and a high boiling point.

*Air drying experiment*

An air drying experiment was performed using 7 of the best experimental procedures observed to this point. The primary motives of the experiment were to obtain an extended comparison of drying rates at more nearly normal conditions and to observe the desired conservation of dry matter and nutritive value in the experimental samples. Triplicate 20 stalk samples were used in each treatment to eliminate any minor variations. The samples were refrigerated until treated so that they could all be started, as closely as possible from the same reference point. The treated samples were placed on the floor of a ventilated room in which temperature did not exceed 30° C. The graph of FIGURE 3 compares the drying rates of alfalfa subjected to solvent dipping and solvent vapor treatments with those of steamed and untreated material. It should be noted that the sample which was exposed to hot perchloroethylene vapors reached the 20% moisture level in ⅓ of the time required for the steamed sample and ⅐ of the time required for the control. It is also significant to note that each treated sample retained at least 4% more total dry matter than the control.

The samples from the air drying experiment were submitted to thorough chemical analysis. It was felt that these samples had a maximum opportunity to display improvements in dry matter retention and nutritive contents since the drying study was continued for 105 hours. This period would simulate approximately field-drying conditions and allow nutritional losses to occur.

Table 3 (p. 15) records the results of the various analysis which were performed.

The lowering of the ash content (on a dry wt. basis) by all the experimental treatments was the first indication of increased dry matter retention. Apparently the control lost more organic matter and, thus, had a higher percentage ash. Since the control actually retained less matter on drying, the percentages of nutrients would logically be disproportionately higher for the control than the experimentally treated samples where the percentage of the total would be decreased by retention of a greater total weight. In order to place the various samples on a truly comparative scale, it was necessary to convert the values back to the fresh weight basis. The conversion factors were obtained by dividing the ash content on a dry weight basis by the ash content on a fresh weight basis. On this scale, therefore, the increased dry matter retention of the experimental samples becomes an advantage rather than a disadvantage.

The table clearly demonstrates that the chloroform dip, benzene dip, perchloroethylene vapor treatment, and five minute steam, showed marked increase in dry matter retention and protein content. The solvent dipping treatmets actually entailed a greater loss of carotene than the control. It is therefore obvious that the preservation of carotene is not merely dependent upon the drying rate, since the samples dipped in chloroform reached 20% moisture level in about ⅛ the time required for the con-

The chemical nature of the moisture barrier

As heretofore mentioned, the locking of the stomata in open position has been considered to be an important aspect in the operation of this process. It has been found that myricyl alcohol is a component of the lipid layer and is highly responsible for the development of the moisture barrier on the surface of the plant. Though the exact mechanism is unknown, it seems highly probable that the process of this invention accelerates drying by dissolving or disorienting the surface lipids or, at least, an important hydrophobic constituent of the lipids, so that the interior moisture becomes relatively free to diffuse through the resultantly more permeable epidermal layer. The presence of myricyl alcohol on the surface of alfalfa seems to present the primary barrier to moisture loss in the cut plant. Though other types of compounds may also establish the moisture barrier, it has been concluded that the solvent treatments described in this application sufficiently remove or disrupt the efficiency of myricyl alcohol so as to promote forage drying.

ANAYLSIS OF AIR-DRY

|  | Control | Choroform dip | Perchloroethylene dip | Benzene dip | Chloroform vapor | Perchloroethylene vapor | Steam (2 min.) | Steam (5 min.) |
|---|---|---|---|---|---|---|---|---|
| Percent Ash (dry wt. basis) | 7.30 | 6.82 | 7.04 | 6.79 | 7.02 | 6.80 | 6.96 | 6.73 |
| Dry wt.-in fresh wt. conversion factor | .222 | .237 | .230 | .239 | .231 | .238 | .233 | .241 |
| Percent increase in dry matter retention | 0 | 6.75 | 3.60 | 7.65 | 4.05 | 7.20 | 4.95 | 8.55 |
| Protein content (as percent of fresh wt.) | 4.99 | 5.26 | 5.06 | 5.33 | 5.17 | 5.24 | 5.17 | 5.25 |
| Percent enrichment over control | 0 | 5.41 | 1.40 | 6.81 | 3.60 | 5.01 | 3.60 | 5.21 |
| Crude fiber content (as percent of fresh wt.) | 6.53 | 6.90 | 6.62 | 6.72 | 6.65 | 6.64 | 6.52 | 7.08 |
| Carotene content (IU/lb. based on fresh wt.) | 10,500 | 6,070 | 7,540 | 7,410 | 8,960 | 38,100 | 29,800 | 42,900 |
| Percent change in carotene content | 0 | −42.2 | −28.2 | −29.4 | −14.7 | +263 | +184 | +308 |
| Estimated TDN (as percent of fresh wt.) | 14.6 | 15.6 | 15.2 | 16.0 | 15.3 | 16.0 | 15.6 | 15.8 |
| Percent increase in TDN | 0 | 6.84 | 4.10 | 9.58 | 4.79 | 9.58 | 6.84 | 8.21 | trol. Apparently the solvent dipping alters the chemistry of a plant in some manner which renders the carotene more susceptible to degradation. Although it appears that heat denatures the carotene-destroying enzyme system, the temperature of boiling chloroform (B.P. 61° C.) is not sufficient to counteract the chemical action of the solvent.

The benzene dip and perchloroethylene vapor treatment exhibited a distinct advantage. It was concluded that the experimental treatments especially the chloroform and benzene dips and perchloroethylene vapor treatment are capable of effecting considerable improvements in the dry matter retention and nutritional value of alfalfa.

Comparison of the perchloroethylene vapor treatment to free evaporation

To compare the perchloroethylene vapor treatment to theoretical free evaporation under the same drying conditions, absorbent paper towels were used since they were found to dry more rapidly than cloth or even water in flat dishes. A quantity of toweling was used which corresponded to the dry weight or our experimental samples and sufficient water was added to bring them up to the weight of the fresh samples. Duplicate control samples and samples treated with hot perchloroethylene vapors were submitted to a drying study along with the paper towels containing an equal amount of water.

The graph shown in FIGURE 4 adequately demonstrates the close approximation of our treated sample to free evaporation. The fact that the towels were spread out so as to expose a maximum surface area and the fact that moisture is entrapped much deeper in the stems of alfalfa very probably accounts for the slight advantage displayed by the paper towels. The experiment clearly shows that the solvent vapor treatment exposed the alfalfa to the most advantageous drying conditions.

Variations in the method of heat application on alfalfa sprayed with various chemicals A. *Kettle steaming.*—In this series 25 stalk sets of alfalfa were sprayed with two ml. perchloroethylene or two ml. of 5% IGEPAL solution (a series of nonionic surfactants which are used as detergents, dispersants, emulsifiers, and wetting agents and which are alkyl phenoxy polyoxyethylene ethanols produced by the reaction of an alkyl phenol with ethylene oxide). Water was brought to boil in a large "canner." The treated stalks were spread out in a wire basket which was then suspended in the top of the canner. The lid was put in place and steaming continued for 3 minutes. Untreated alfalfa was also steamed to serve as a control. The steamed packs of alfalfa were weighed in tared wire baskets. The baskets were set in a 60° C. forced-draft oven for 30 minutes. Untreated, unsteamed alfalfa was also placed in the oven as a master control. The experiment was done in quadruplicate. The average results are listed below:

| | Percent |
|---|---|
| Master control | 42.7 |
| Steamed only | 46.0 |
| Perchloroethylene | 58.6 |
| IGEPAL | 65.0 |

It is to be noted that the addition of chemicals brought about a significant improvement. Though steam in an enclosed system proved effective as a heat source for enhancing the action of chemicals on drying rate, in a field machine, the production of steam would entail some problems such as the necessity of transporting water into the field, etc.

B. *Hot air.*—Hot air would not have some of the disadvantages of steam. Two milliliter quantities of perchloroethylene and 5% IGEPAL were respectively sprayed onto 15 stalk sets of alfalfa. The treated samples were weighed in the tared baskets along with untreated sets of alfalfa stalks as controls. The baskets were placed in a forced-draft oven for 2 minutes at 185° C. then removed and cooled to room temperature. These heat treated stalks were placed in the oven at 60° C. for 30 minutes along with untreated alfalfa as a master control. The results below are the averages of duplicate portions. The alfalfa was then heat treated according to the ironing technique already described. Alfalfa to which no addition of chemical had been made was also heat treated. All samples were then placed in the forced-draft oven for 30 minutes and weight loss data collected. Results of this series presented below represent averages of at least duplicate tests.

| Ironing time | Material | Description | Percent sol. | Percent weight loss through 30 mins. drying at 60° C. |
|---|---|---|---|---|
| 30 secs | | Control | | 69.0 |
| | Orzan "S" | Sodium salt of sulfonate lignin (An emulsion stabilizer). | 5<br>20 | 71.2<br>80.6 |
| | Alkyl benzene sulfonate (ABS). | Anionic detergent | 2 | 80.0 |
| | IGEPAL | Non-ionic surfactant | 2 | 83.2 |
| | Triton X-200 | Anionic surfactant | 2 | 80.2 |
| | Triton X-400 | Cationic surfactant | 2 | 81.6 | trials calculated again as percent of total moisture removed:

|  | Percent |
|---|---|
| Untreated master control | 52.6 |
| Heat treated control | 63.7 |
| IGEPAL | 72.7 |
| Perchloroethylene | 80.6 |

The hot air treatment alone caused a significant improvement in drying rate. Note additionally the positive effect of the chemicals.

C. *Exploration of "ironing" techniques.*—Another more practical method of applying heat in a field operation might be passing the hay between hot rollers. In an effort to reduce this technique to a laboratory scale, heat was applied to alfalfa with an ordinary household iron. In preliminary experiments the hay was wrapped in tinfoil when the iron was applied but this impeded expellation of the steam produced. Later experiments showed the hot iron could be applied directly to the alfalfa without burning and with improved effectiveness. In this procedure, 15 stalks of alfalfa were spread on a piece of "TRANSITE" insulation board in such a manner that two placements of the iron would cover all the stalks. The duration of each placement was 30 seconds. Duplicate runs were made in which two ml perchloroethylene or two ml. of 5% IGEPAL solution was sprayed onto the alfalfa prior to ironing.

In control experiments the hay was ironed with no prior treatment. (Unironed alfalfa's drying rate was also determined.) The loss through 30 minutes of 60° C. drying in a forced-draft oven was determined and calculated as moisture lost based on the amount of water originally present in the alfalfa. The results were as follows:

|  | Percent |
|---|---|
| Master control | 45.2 |
| Control | 69.5 |
| Perchloroethylene | 88.6 |
| IGEPAL | 83.2 |

The ironing technique in combination with the chemicals produce the most dramatic increases in drying rate of the methods tested.

*Chemical additives*

Because of the cost of many solvents, use for large scale operation might be prohibitive without recovery means. Because of this consideration, a series of surface active agents and related materials were tested since these agents are inexpensive and from the economic standpoint may be used without necessitating recovery thereof.

In this survey aqueous solutions of various additives were sprayed onto 15 stalk batches of alfalfa in 2 ml.

*Solvent usage experiments on dipping procedure*

Though solvent dipping procedures set out above seemed to be uneconomically desirable because of the high loss of solvent, it was determined that consumption of the solvent could be lowered considerably by placing a layer of water over it. Thus as the alfalfa emerges from the dipped tank, a water rinse would assist in removing the solvent.

*Summary*

In review, it is generally recognized that moisture balance within plants is regulated by the stomata which open and close by the expansion and contraction of guard cells depending upon the needs of the plant. When a plant is severed from its root system, the stomata quickly close in an effort to preserve life of the individual cells as long as posible, thus encapsulating the water making it difficult to remove. Over the remaining plant surface there exists a waxy coating which serves as a barrier against moisture loss.

This barrier to moisture loss has been removed in the past partially by utilizing the various crushing techniques which rupture the surface coating. Though this field has been explored thoroughly in recent years, the magnitude of the effect obtained by any physical treatment has been limited. This invention is aimed at maintaining the stomata in open position to thus accelerate drying. This invention has accelerated drying by either altering or removing the waxy leaf and stem coating which acts as a moisture barrier. Removal of the waxy coating has been found most effective by the utilization of solvents which fall in the intermediate range on the solvent polarity scale. Since it has been determined that myricyl alcohol was particularly involved in the moisture control mechanism of the plant, the removal of the myricyl alcohol by utilization of an organic solvent or of a surface active agent used particularly though not necessarily in an aqueous solution having an affinity for the bonding mechanism of the myricyl alcohol. The action of the fluid would be to solubilize the myricyl alcohol by dissolving or emulsifying. Since myricyl alcohol is a 31 carbon straight chain compound, its structure is such that it would be expected that the polar hydroxylic end would be attached through hydrogen bonding to the oxygen-containing hydrophilic constituents of the epidermal layer. The aliphatic end could quite conceivably extend out from the surface in a monomolecular film and provide the hydrophobic barrier thus preventing moisture transfer. Because of the nature of the myricyl alcohol, the use of an emulsifying agent which would attract the molecules hydrophobic tail with sufficent tenacity to suspend the substance was proved feasible with use of various surfactants or emulisfying or detergent agents, all of which would be capable of attracting the hydrophobic tail of the myricyl alcohol molecule and thus remove it from the leaf surface.

Since it has been found that both solvents and surfactants will assist in the removal and disruption of the myricyl alcohol, it is obvious that a combination of solvents and surfactants would also be available. It thus would be possible to use a small amount of solvent with a detergent or surface acting agent and thus enhance the effectiveness of the drying process without substantially increasing the cost.

It will therefore be obvious that the surface active agents utilizable in this invention would be those which would have a particular affinity for myricyl alcohol and other such components which create the moisture barrier in plants. Of particular note, in addition to the surfactants specifically referred to herein, the most common types of nonionic surfactants utilizable are those of the alkylphenoxy polyethoxy ethanols.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:

1. A process for the drying of green forage which includes the steps of:
    (a) applying a fluid selected from the group consisting of: carbon tetrachloride, benzene, perchlorethylene, ether and chloroform to the surface of said forage having the ability to solubilize myricyl alcohol for the purpose of maintaining the green forage stomata open, and
    (b) exposing said treated forage to a drying step.

2. A process for the drying of forage as in claim 1 and including the step of:
    (a) applying heat directly to said forage subsequent to the application of said fluid.

3. A process for the drying of forage as in claim 1 and wherein:
    (a) said fluid contains a surfactant having the ability to emulsify myricyl alcohol.

4. A process for the drying of forage as in claim 1 and wherein:
    (a) said fluid is a mixture of a solvent, a surfactant, and a fiber disintegrating type enzyme.

5. A process for the drying of forage as in claim 1 and including the step of:
    (a) preheating the fluid to its boiling temperature prior to applying said fluid to the surface of said forage.

6. A process for the drying of forage as in claim 1 and wherein said drying step includes:
    (a) ironing said forage.

7. A process for the drying of forage as in claim 1 and wherein:
    (a) said fluid is applied by spraying said preheated fluid including the steps of
    (b) maintaining said spray in a heated condition during application.

8. A process for the drying of forage as in claim 7 and wherein:
    (a) said spray is maintained in a heated condition during application by confining said spray in a hood during application to said forage.

9. A process for the drying of forage as in claim 4 and including the step of:
    (a) maintaining a short incubation period after application of said fluid to permit enzyme inoculation to proceed to completion.

10. A process for the drying of forage as in claim 1 and:
    (a) maintain said forage dipped for a period of approximately 30 seconds.

11. A process for the drying of forage as in claim 1 and:
    (a) including the step of washing said forage with water subsequent to said drying step to recover said fluid.

12. A process for the drying of forage as in claim 1 and including the step of:
    (a) mechanically rupturing the epidermal layer of said forage, prior to the application of said fluid.

13. A process for the drying of forage as in claim 3 and wherein said surfactant is from about 2% to 5% of an aqueous solution.

14. A process for the drying of forage as in claim 3 and wherein:
    (a) said surfactant is selected from the group consisting of: alkyl benzene sulphonate, alkyl phenoxy polyethoxy ethanol, and sodium lignosulfonate.

15. A process for the drying of green forage which includes the steps of:
    (a) applying perchloroethylene to the surface of said forage to solubilize myricyl alcohol for the purpose of maintaining the green forage stomato open, and
    (b) exposing said treated forage to a drying step.

References Cited by the Examiner

UNITED STATES PATENTS

| | | | |
|---|---|---|---|
| 1,570,891 | 1/1926 | Heuser | 99—9 |
| 2,299,745 | 10/1942 | Hansen | 99—9 |
| 2,358,869 | 9/1944 | Maurer et al. | 99—208 |
| 2,482,635 | 9/1949 | Petering et al. | 99—8 |
| 2,599,810 | 6/1952 | Chenicek et al. | 99—8 |
| 2,651,572 | 9/1953 | Bickoff | 99—8 |
| 2,944,903 | 7/1960 | Chenicek et al. | 99—8 |
| 3,094,431 | 6/1963 | Goldstein et al. | 34—36 |

OTHER REFERENCES

Von Loesecke, Drying and Dehydration of Foods, 2nd ed., pp. 32–3, Reinold Publishing Corp., New York, N.Y. (1955).

A. LOUIS MONACELL, *Primary Examiner.*